United States Patent Office 3,272,840
Patented Sept. 13, 1966

3,272,840
5 - IMINO - 1 - METHYLCARBAMOYL-3-(5-NITRO-2-FURYL)-Δ²-1,2,4-TRIAZOLINE AND ITS PREPARATION
Louis Edmond Benjamin, Norwich, N.Y., assignor to The Norwich Pharmacal Company, a corporation of New York
No Drawing. Filed June 10, 1965, Ser. No. 463,030
2 Claims. (Cl. 260—308)

This invention relates to a new chemical compound, 5-imino-1-methylcarbamoyl-3-(5-nitro-2-furyl)-Δ² - 1,2,4-triazoline of the formula:

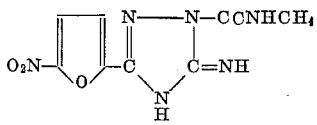

and to a method for the preparation thereof.

The new compound of this invention is distinguished by its high order of antibacterial activity, being inimical in very small amounts to a wide range of bacteria. Illustrative of its antibacterial potency is the following table depicting its in vitro effect on a variety of bacteria:

| Organism | Strain | MIC* (mcg./ml.) |
|---|---|---|
| Staphylococcus aureus | Mi-6 (penicillin sensitive) | 6.25 |
|  | Mi-12 (penicillin resistant) | 1.5 |
| Escherichia coli | Es-2 | 0.095 |
|  | Es-L | 1.5 |
| Salmonella typhosa | SaD-13 | 0.38 |
| Streptococcus pyogenes | StA-1 | 12.5 |
| Streptococcus agalactiae | StB-12 | 50.0 |
| Streptococcus faecalis | StD-7 | 6.0 |
| Erysipelothrix insidiosa | Er-4 | 0.38 |
| Aerobacter aerogenes | Ae-6 | 3.0 |
| Diplococcus pneumoniae | Di-10 | 6.0 |

*MIC=Minimal Inhibitory Concentration.

Upon peroral administration to mice lethally infected with *Staphylococcus aureus*, *Salmonella typhosa* or *Escherichia coli* protection against death is secured. Thus when administered in a dose of from about 20 to about 35 mg./kg. to such infected mice, protection of 50% of the animals is obtained.

The new compound of this invention has a relatively low toxicity. In mice its LD₅₀ upon peroral administration is about 1900 mg./kg.

For convenience in administration the compound of this invention may be readily formulated into conventional pharmaceutical composition such as tablets, suspensions, capsules, lozenges, solutions and the like using excipients and adjuvants commonly employed in the pharmaceutical art.

In order that this invention may be readily available to and understood by those skilled in the art, the following illustrative example of its preparation is supplied:

EXAMPLE

A. Preparation of N-guanidino-5-nitro-2-furamidine dihydrochloride

Hydrogen chloride is passed through a stirred mixture of 437 g. (3.21 moles) of aminoguanidine bicarbonate, 443 g. (3.21 moles) of 5-nitro-2-furonitrile and 7340 ml. of ethanol at a rapid rate with the temperature maintained below 30° by means of an ice bath. At the end of 4.5 hours the mixture is poured into 10 l. of ether and refrigerated overnight. The solid is isolated by filtration and washed with ether. Upon air drying to constant weight there are obtained 1064 g. (91.7%). The IR curve of this material identifies it as a mixture of ethyl 5-nitro-2-furimidate hydrochloride and aminoguanidine dihydrochloride. This mixture is added to 4 l. of dimethylformamide and heated to 55–60° by means of a water bath. After 30 minutes at this temperature, the mixture is poured into 10 l. of ether and refrigerated overnight. The product is isolated by filtration and washed by slurrying in 3.5 l. of ethanol. The product is washed on the funnel with ether and dried to constant weight at 60°. There are obtained 736 g. (80%) of N-guanidino-5-nitro-2-furamidine dihydrochloride which may be recrystallized from methanol (30 ml./g.)-ether (30 ml./g.) to give crystals melting at about 270°.

*Anal.*—Calcd. for C₆H₈N₆O₃·2HCl: C, 25.26; H, 3.54; Cl, 24.87; N, 29.48. Found: C, 25.23; H, 3.58; Cl, 25.14; N, 29.49.

B. Preparation of 5-imino-3-(5-nitro-2-furyl)-Δ²-1,2,4-triazoline

To propylene glycol (800 ml.) heated at 180° is added rapidly over a 5 minute interval, 500 g. (1.75 moles) of N-guanidino-5-nitro-2-furamidine dihydrochloride. The flask and contents are cooled to 50° and the mixture is then poured into water (10 l.). The resulting solid is isolated by filtration and washed on the funnel with water. There are obtained, after drying at 110°, 130 g. (38%) of 5-imino-3-(5-nitro-2-furyl)-Δ²-1,2,4-triazoline, M.P. 269–271°.

C. Preparation of 5-imino-1-methylcarbamoyl-3-(5-nitro-2-furyl)-Δ²-1,2,4-triazoline A mixture of 5-imino-3-(5-nitro-2-furyl) Δ²-1,2,4-triazoline (48.8 g., 0.25 mole), methyl isocyanate (30 ml.: ca. 0.5 mole) and dimethylformamide (225 ml. is heated for 1 hour on a steam bath. The mixture is cooled, diluted with water (ca. 300 ml.) and filtered. A yield of 56 g. (87%) of pale yellow solid is obtained after drying at 110°; M.P. ca. 250°. Recrystallization from dimethylformamide (5 ml./g.) gives 33 g. of product which melts at ca. 250°, resolidifies and melts again at 287–289°. An analytical sample is obtained after recrystallization from dimethylformamide (5 ml./g.); M.P. ca. 235° and 287–289°.

*Anal.*—Calcd. for C₈H₈N₆O₄: C, 38.10; H, 3.20; N, 33.33. Found: C, 38.25; H, 3.34; N, 33.31.

What is claimed is:
1. The compound 5-imino-1-methylcarbamoyl-3-(5-nitro-2-furyl)-Δ²-1,2,4-triazoline of the formula:

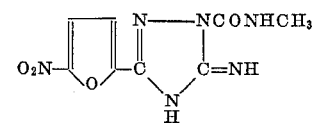

2. The method of preparing 5-imino-1-methylcarbamoyl-3-(5-nitro-2-furyl)-Δ²-1,2,4-triazoline which comprises reacting 5-imino - 3 - (5-nitro-2-furyl)-Δ²-1,2,4-triazoline with methyl isocyanate.

No references cited.

ALEX MAZEL, *Primary Examiner.*

ALTON D. ROLLINS, *Assistant Examiner.*

UNITED STATES PATENT OFFICE
CERTIFICATE OF CORRECTION

Patent No. 3,272,840                           September 13, 1966

Louis Edmond Benjamin

It is hereby certified that error appears in the above numbered patent requiring correction and that the said Letters Patent should read as corrected below.

Column 1, lines 15 to 20, for that portion of the formula reading $N-CCNHCH_4$                  read                  $NCONHCH_3$ Signed and sealed this 29th day of August 1967.

(SEAL)
Attest:

ERNEST W. SWIDER
Attesting Officer

EDWARD J. BRENNER
Commissioner of Patents